(12) United States Patent
Lin et al.

(10) Patent No.: US 8,498,104 B2
(45) Date of Patent: Jul. 30, 2013

(54) MOUNTING APPARATUS FOR DATA STORAGE DEVICE

(75) Inventors: Chieh-Hsiang Lin, New Taipei (TW); Chih-Min Lin, New Taipei (TW); Wen-Chen Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 207 days.

(21) Appl. No.: 13/207,451

(22) Filed: Aug. 11, 2011

(65) Prior Publication Data
US 2012/0162894 A1 Jun. 28, 2012

(30) Foreign Application Priority Data
Dec. 22, 2010 (TW) .................................. 99145245

(51) Int. Cl.
G06F 1/16 (2006.01)
H05K 5/00 (2006.01)
H05K 7/00 (2006.01)

(52) U.S. Cl.
USPC .................................. 361/679.31; 312/223.2

(58) Field of Classification Search
None
See application file for complete search history.

(56) References Cited

U.S. PATENT DOCUMENTS

| | | | | |
|---|---|---|---|---|
| 5,247,427 A * | 9/1993 | Driscoll et al. | .......... | 361/679.39 |
| 5,546,276 A * | 8/1996 | Cutts et al. | .................. | 361/724 |
| 5,586,003 A * | 12/1996 | Schmitt et al. | .......... | 361/679.58 |
| 6,052,278 A * | 4/2000 | Tanzer et al. | .......... | 361/679.33 |
| 6,058,016 A * | 5/2000 | Anderson et al. | .............. | 361/727 |
| 6,154,361 A * | 11/2000 | Anderson et al. | ........ | 361/679.34 |
| 6,270,174 B1 * | 8/2001 | Nishi | .......................... | 312/223.1 |
| 6,282,087 B1 * | 8/2001 | Gibbons et al. | .......... | 361/679.32 |
| 6,317,329 B1 * | 11/2001 | Dowdy et al. | .................. | 361/725 |
| 6,325,353 B1 * | 12/2001 | Jiang | ............................. | 248/682 |
| 6,381,139 B1 * | 4/2002 | Sun | .................. | 361/725 |
| 6,424,523 B1 * | 7/2002 | Curtis et al. | ............ | 361/679.33 |
| 6,480,391 B1 * | 11/2002 | Monson et al. | .................. | 361/752 |
| 6,515,855 B1 * | 2/2003 | Removedummy | ........ | 361/679.33 |
| 6,560,098 B1 * | 5/2003 | Beinor et al. | ............ | 361/679.39 |
| 6,775,142 B1 * | 8/2004 | Bell et al. | ...................... | 361/725 |
| 2004/0150947 A1 * | 8/2004 | Tang | ............................. | 361/685 |
| 2006/0050487 A1 * | 3/2006 | Wu et al. | ...................... | 361/724 |
| 2006/0120032 A1 * | 6/2006 | Song | ............................. | 361/685 |
| 2007/0188989 A1 * | 8/2007 | Paul et al. | ..................... | 361/685 |
| 2007/0230111 A1 * | 10/2007 | Starr et al. | ..................... | 361/685 |
| 2008/0062635 A1 * | 3/2008 | Chang | ............................. | 361/685 |
| 2009/0059509 A1 * | 3/2009 | Peng et al. | ..................... | 361/685 |
| 2009/0189042 A1 * | 7/2009 | Chen et al. | .................. | 248/309.1 |

\* cited by examiner

*Primary Examiner* — Lisa Lea Edmonds
*Assistant Examiner* — Xanthia C Cunningham
(74) *Attorney, Agent, or Firm* — Altis Law Group, Inc.

(57) ABSTRACT

A mounting apparatus includes an enclosure, a bracket for fixing a data storage device, an assistant plate arranged between the bracket and the enclosure, a handle pivotably mounted to the bracket, and a resisting member. The assistant plate defines a through hole and a locking hole. A handle with a locking portion is pivotably attached to the bracket. The resisting member is slidably mounted between the assistant plate and the first sidewall. The resisting member includes a pull portion corresponding to the through hole, and a resilient tongued portion engaged in the through hole of the assistant plate. When the handle is rotated toward to the base, the locking portion of the handle extends through the locking hole of the assistant plate to engage with the pull portion to move the resisting member to deform the tongued portion, such that the tongued portion is raised to resist against the bracket.

18 Claims, 5 Drawing Sheets

MOUNTING APPARATUS FOR DATA STORAGE DEVICE

CROSS-REFERENCE TO RELATED APPLICATIONS

Relevant subject matter is disclosed in two pending U.S. patent applications, with application Ser. Nos. 13/189,575 and 13/191,472, respectively, filed on Jul. 25, 2011 and Jul. 27, 2011, and both entitled "MOUNTING APPARATUS FOR DATA STORAGE DEVICE, which are assigned to the same assignee with this patent application.

BACKGROUND

1. Technical Field

The present disclosure relates to mounting apparatuses and, more particularly, to an apparatus for mounting a data storage device.

2. Description of Related Art

Many electronic apparatus, such as computers and servers, include data storage devices, such as hard disk drives, compact disk read-only memory drives, digital video disk drives, and floppy disk drives. These devices are added to increase functionality of the apparatus as desired by a user. The installation of a hard disk drive in a computer often involves using screws to attach the hard disk drive to a bracket, and then the bracket is fixed to a chassis of the computer. Usually, there is space between the bracket and the chassis, which is a weakness that can allow the data storage device to more easily vibrate or move about.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
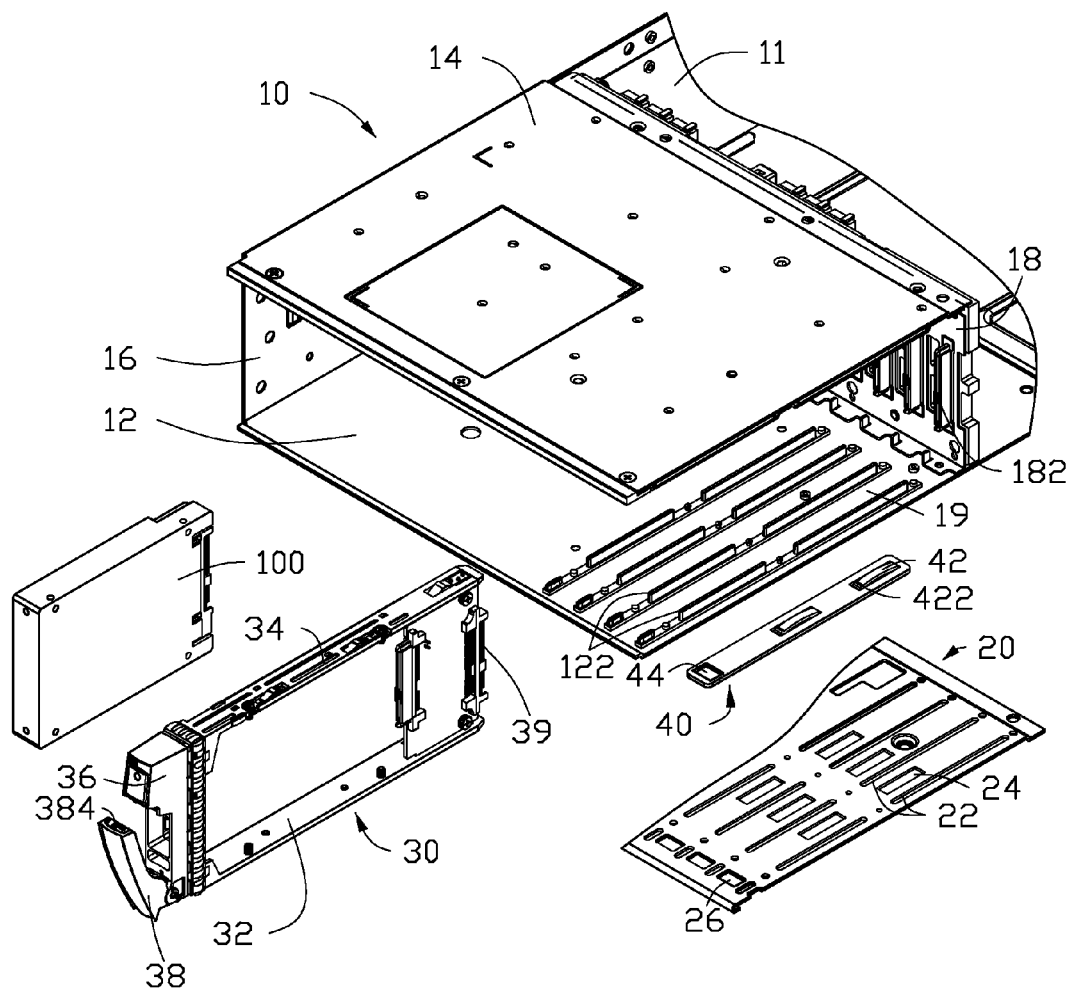
FIG. 1 is an exploded, isometric view of an embodiment of a mounting apparatus, together with a data storage device.
Figure 2:
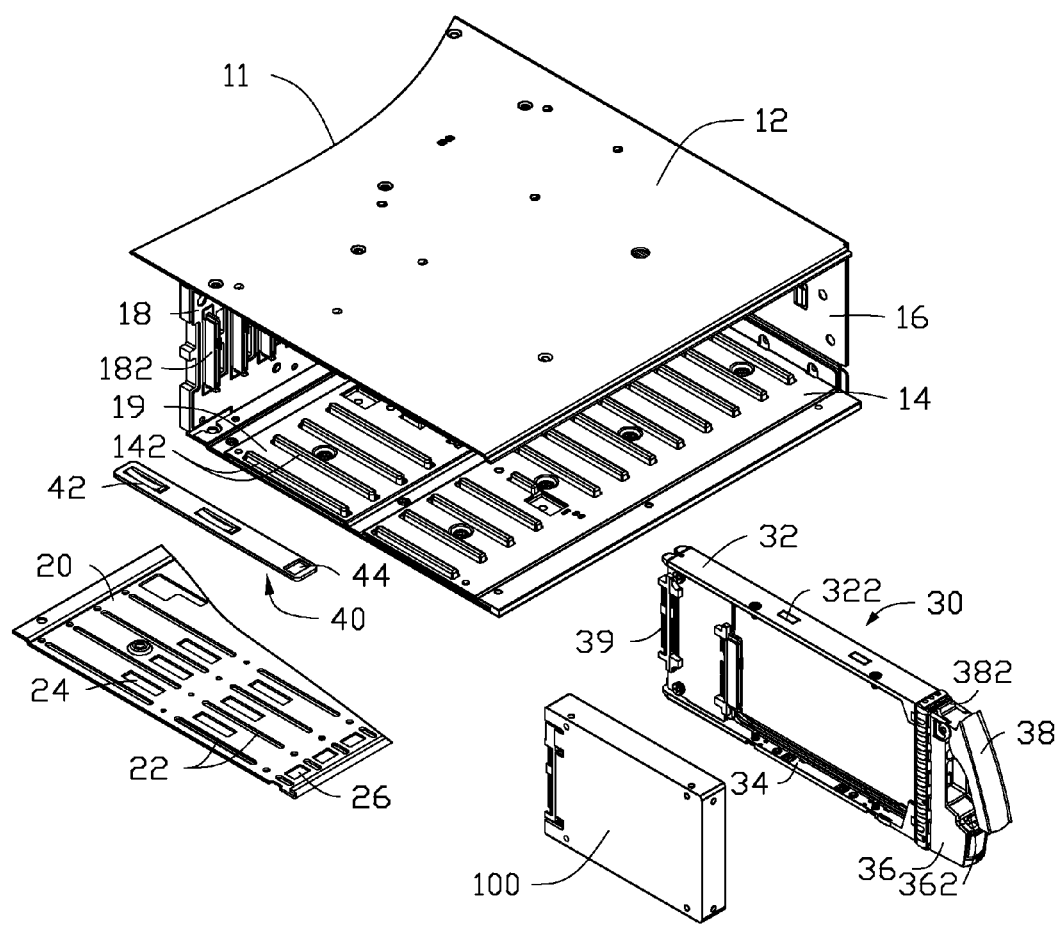
FIG. 2 is an inverted view of FIG. 1.

Referring to FIG. 1 and FIG. 2, an embodiment of a mounting apparatus is provided to mount a data storage device 100, such as a hard disk drive. The mounting apparatus includes an enclosure 10, a bracket 30 receiving the data storage device 100, and a resisting member 40.

The enclosure 10 includes a shell 11 and an assistant plate 20. The shell 11 includes a first sidewall 12 and a second sidewall 14 parallel to the first sidewall 12. An opening 16 is bound by the first ends of the first sidewall 12 and the second sidewall 14. An end wall 18 is substantially perpendicularly connected between the second ends of the first sidewall 12 and the second sidewall 14. Two parallel flanges 122 protrude on an inside of the first sidewall 12, along a direction from the first end to the second end of the first sidewall 12. Two parallel flanges 142 protrude on an inside of the second sidewall 14 and align with the flanges 122. The first and second sidewalls 12 and 14, the flanges 122 and 142 together define a receiving space 19. A first connector 182 is arranged on the end wall 18, facing the opening 16.

The assistant plate 20 defines two spaced through holes 24. Two elongated through slots 22 is defined in the assistant plate 20 beside of each of the through holes 24. A locking hole 26 is defined in one end of the assistant plate 20.

The bracket 30 includes a first mounting plate 32, and a second mounting plate 34 parallel to the first mounting plate 32. A base 36 is connected between the first ends of the first mounting plate 32 and the second mounting plate 34. A handle 38 is pivotably mounted to the base 36. A second connector 39 is arranged in the bracket 30 adjacent to the second ends of the first mounting plate 32 and the second mounting plate 34 for electrical connection to the data storage device 100. Two shockproof members 322 are attached to an outer surface of the first mounting plate 32 and are spaced from each other and corresponding to the through holes 24. A hook 362 is formed on an outer side of the base 36. The handle 38 includes a locking portion 382 protruding on a first end of the handle 38, and defines a locking slot 384 in a second end of the handle 38.

The resisting member 40 is substantially an elongated plate which is slidable and receivable between the flanges 122. A pull portion 44 is formed at one end of the resisting member 40. In this embodiment, the pull portion 44 is a cutout. In other embodiments, the pull portion 44 can be a tab protruding on the resisting member 40. Two spaced arc-shaped resilient tongued portions 42 are formed from the resisting portion 40 and extend toward the pull portion 44. A block 422 protrudes on a free end of each tongued portion 42.

Figure 3:
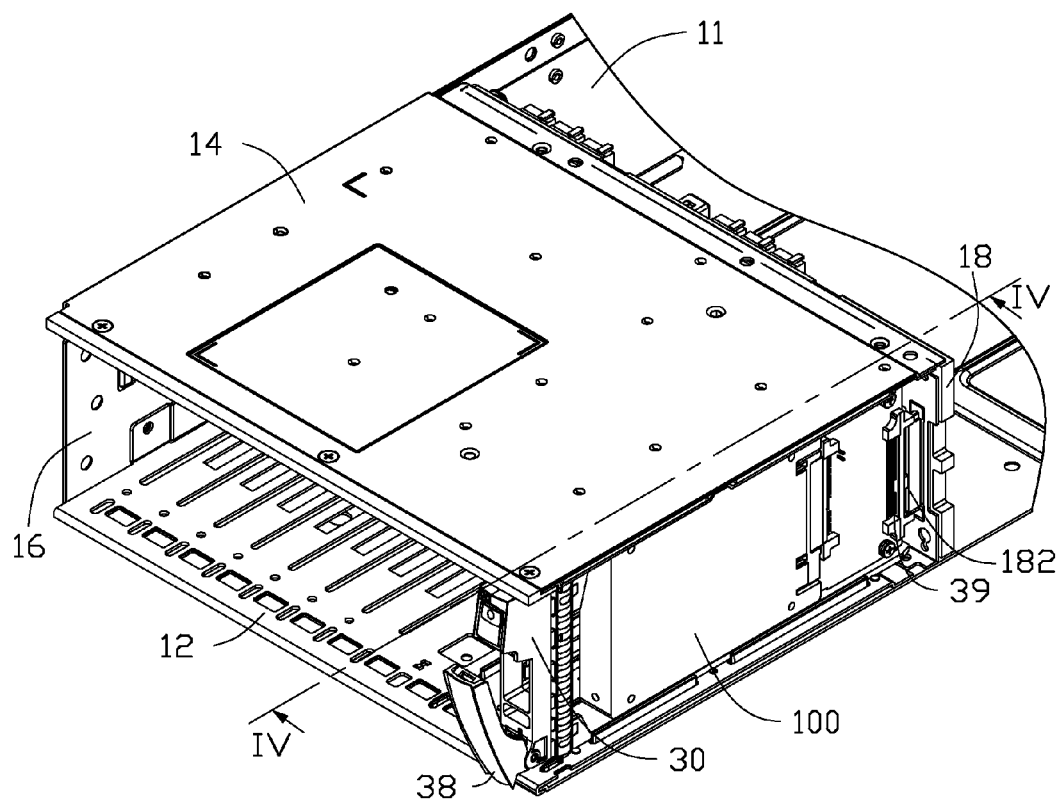
FIG. 3 is an assembled view of FIG. 1.
Figure 4:
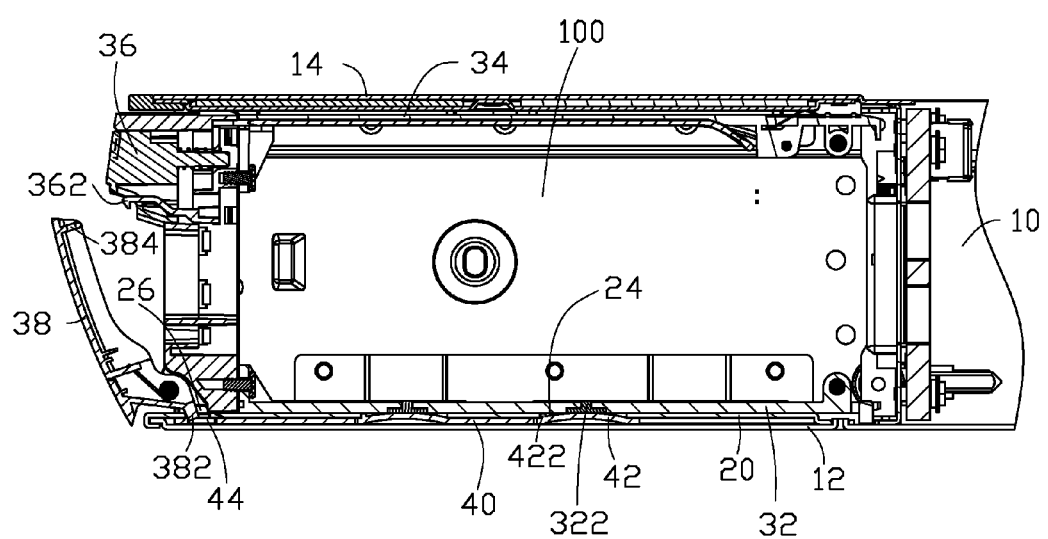
FIG. 4 is a sectional view of FIG. 3 along the line of IV-IV.

Referring to FIG. 3 and FIG. 4, in assembly, the resisting member 40 is received between the flanges 122 of the first sidewall 12. The assistant plate 20 is placed on the first sidewall 12, with the locking hole 26 near the opening 16. The flanges 122 engage in the through slots 22 respectively. The tongued portions 42 extend through the through holes 24 with the blocks 422 engaging in the through holes 24, respectively.

The data storage device 100 is mounted on the bracket 30 between the first mounting plate 32 and the second mounting plate 34. The bracket 30 is slid into the receiving space 19 through the opening 16, with the second connector 39 aligning with the first connector 182. Then the bracket 30 is pushed to plug the second connector 39 into the first connector 182.

Figure 5:
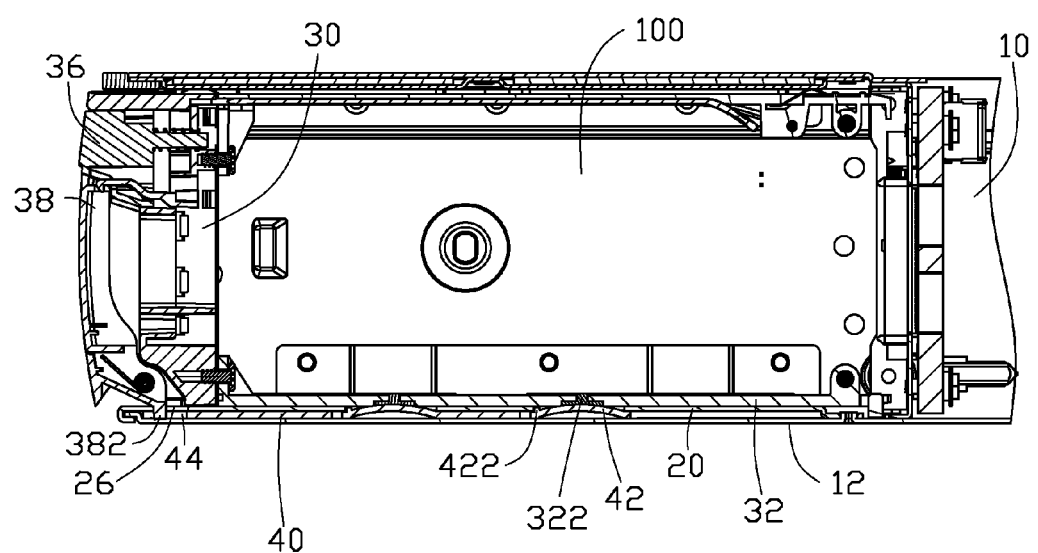
FIG. 5 is similar to FIG. 4, but showing a different state of use.

Referring to FIG. 5, the handle 38 is rotated toward the base 36 until the hook 362 is locked to the locking slot 384 to latch the handle 38 to the base 36. While the handle 38 is rotating, the locking portion 382 extends through the locking hole 26 to resist the pull portion 44 to slide the resisting member 40 away from the end wall 18 between the first sidewall 12 and the assistant plate 20. The blocks 422 are resisted against the inner sidewalls of through holes 24 to deform the tongued portions 42. Therefore, the tongued portions 42 are raised toward the first mounting plate 32 to resist against the shockproof members 322, for firmly mounting the bracket 30 in the shell 11.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mounting apparatus for a data storage device, the mounting apparatus comprising:
    an enclosure comprising a shell and an assistant plate, wherein the shell comprises a first sidewall, the assistant plate is attached to the first sidewall, the assistant plate defines a through hole and a locking hole;
    a bracket received in the shell, wherein the bracket comprise a base and a handle pivotably mounted to the base, the handle comprises a locking portion; and
    a resisting member slidably mounted between the assistant plate and the first sidewall, wherein the resisting member comprises a pull portion aligning to the locking hole of the assistant plate and a resilient tongued portion engaging in the through hole of the assistant plate;
    wherein when the handle is rotated toward to the base, the locking portion of the handle extends through the locking hole of the assistant plate to engage with the pull portion to move the resisting member to deform the tongued portion such that the tongued portion is raised to resist against the bracket.

2. The mounting apparatus of claim 1, wherein a block is formed on a free end of the tongued portion to resist against an inner wall of the through hole of the assistant plate.

3. The mounting apparatus of claim 1, wherein the tongued portion extends from the resisting member toward the pull portion.

4. The mounting apparatus of claim 1, wherein the pull portion is a cutout defined in one end of the resisting member.

5. The mounting apparatus of claim 1, wherein a shockproof member is set on an outer surface of the bracket to align with the tongued portion.

6. The mounting apparatus of claim 1, wherein the resisting member is an elongated plate.

7. The mounting apparatus of claim 1, wherein the shell comprises a second sidewall parallel to the first sidewall, two parallel flanges protrude on the first sidewall, two parallel flanges protrude on the second sidewall and align with the flanges of the first sidewall, the first and second sidewalls and the flanges together define a receiving space for receiving the bracket.

8. The mounting apparatus of claim 7, wherein two elongated through slots is defined in the assistant plate, for the two parallel flanges of the first sidewall extending therethrough.

9. The mounting apparatus of claim 1, wherein a locking slot is defined in the handle opposite to the locking portion, a hook extends from the base to be locked to the locking slot to latch the handle to the base.

10. An assembly comprising:
    an enclosure comprising a first sidewall, a second sidewall substantially parallel to the first sidewall, and an end wall arranged between the first and second sidewalls, wherein a first connector is set on the end wall;
    a bracket comprising a first mounting plate, a second mounting plate substantially parallel to the first mounting plate, a base arranged between first ends of the first and second mounting plates, a second connector arranged between the second ends of the first and second mounting plates, wherein a handle is pivotably attached to the base, the handle comprises a locking portion;
    an assistant plate arranged between the first mounting plate of the bracket and the first sidewall of the enclosure, the assistant plate defining a through hole and a locking hole;
    a data storage device fixed in the bracket between the first mounting plate and the second mounting plate of the bracket, wherein the data storage device is connected to the second connector, the second connector is connected to the first connector; and
    a resisting member slidably mounted between the assistant plate and the first sidewall, wherein the resisting member comprises a pull portion aligning with the locking hole of the assistant plate and a resilient tongued portion engaging in the through hole of the assistant plate;
    wherein when the handle is rotated toward to the base, the locking portion of the handle extends through the locking hole of the assistant plate to engage with the pull portion to move the resisting member to deform the tongued portion, therefore the tongued portion is raised to resist against the bracket.

11. The assembly of claim 10, wherein a block is formed on a free end of the tongued portion to resist against an inner wall of the through hole of the assistant plate.

12. The assembly of claim 10, wherein the tongued portion extends from the resisting member toward the pull portion.

13. The assembly of claim 10, wherein the pull portion is a cutout defined in one end of the resisting member.

14. The assembly of claim 10, wherein a shockproof member is set on an outer surface of the first mounting plate of the bracket to align with the tongued portion.

15. The assembly of claim 10, wherein the resisting member is an elongated plate.

16. The assembly of claim 10, wherein two parallel flanges protrude on the first sidewall, two parallel flanges protrude on the second sidewall and align with the flanges, the first and second sidewalls and the flanges together define a receiving space for receiving the bracket.

17. The assembly of claim 16, wherein two elongated through slots is defined in the assistant plate, for the two parallel flanges of the first sidewall extending therethrough respectively.

18. The assembly of claim 10, wherein a locking slot is defined in the handle opposite to the locking portion, a hook extends from the base to be locked to the locking slot to latch the handle to the base.

* * * * *